United States Patent [19]

Stolpe

[11] Patent Number: 4,901,467
[45] Date of Patent: Feb. 20, 1990

[54] ARROW TIP FOR FISHING

[76] Inventor: Ritch A. Stolpe, R.R. 4, Box 28, Sioux City, Iowa 51109

[21] Appl. No.: 343,867

[22] Filed: Apr. 27, 1989

[51] Int. Cl.$^4$ ............................................. A01K 81/04
[52] U.S. Cl. ........................................ 43/6; 273/419; 124/79
[58] Field of Search ................. 43/1, 6; 273/419, 420; 124/79

[56] References Cited

U.S. PATENT DOCUMENTS

| | | | |
|---|---|---|---|
| 2,806,317 | 9/1957 | Minisini | 43/6 |
| 3,036,395 | 6/1959 | Nelson | 43/6 |
| 3,164,385 | 3/1962 | Shure | 273/419 |
| 4,807,382 | 2/1989 | Albrecht | 43/6 |
| 4,819,360 | 4/1989 | Thomas | 43/6 |

Primary Examiner—Nicholas P. Godici
Assistant Examiner—Mike Starkweather
Attorney, Agent, or Firm—Baker & McKenzie

[57] ABSTRACT

The invention is embodied in an arrow tip for use in bowfishing. The tip is comprised of a tip body having a bore in one end designed to receive the shaft of an arrow. The arrow is attached to the tip with a fixed non-rotative connection. The body has a threaded end opposite the bore, and a replaceable point is rotatably attached to the threaded end. A pivotable retainer or blade is held in a slot formed in the body, and the replaceable point is used to hold the blade in a plurality of positions, one being a fish retention position, and another being an arrow removal position.

12 Claims, 1 Drawing Sheet

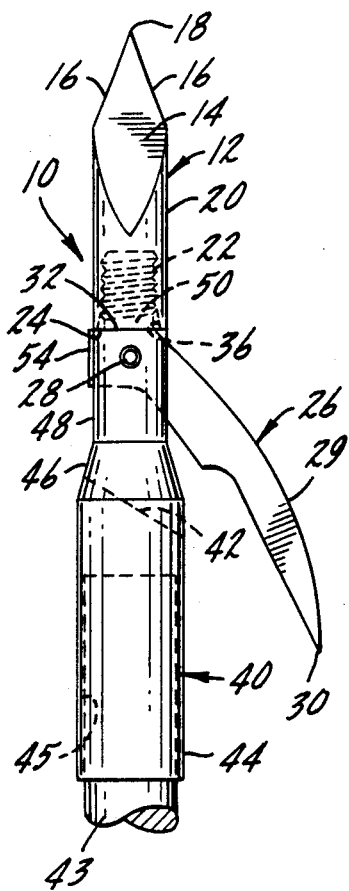
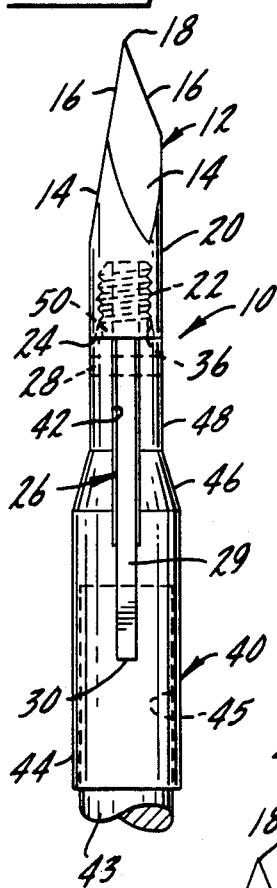
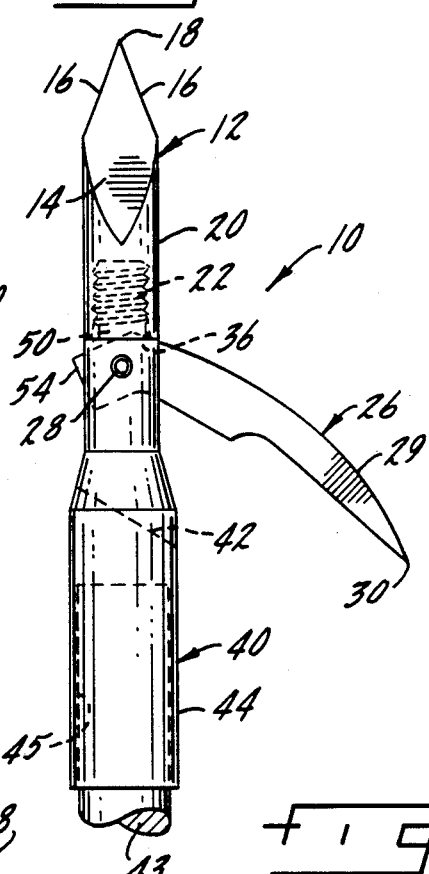
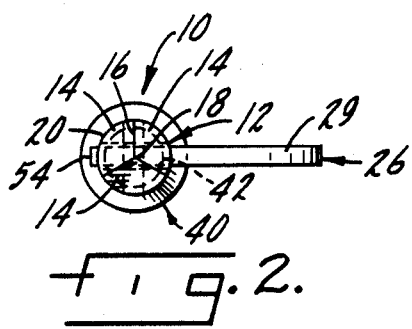
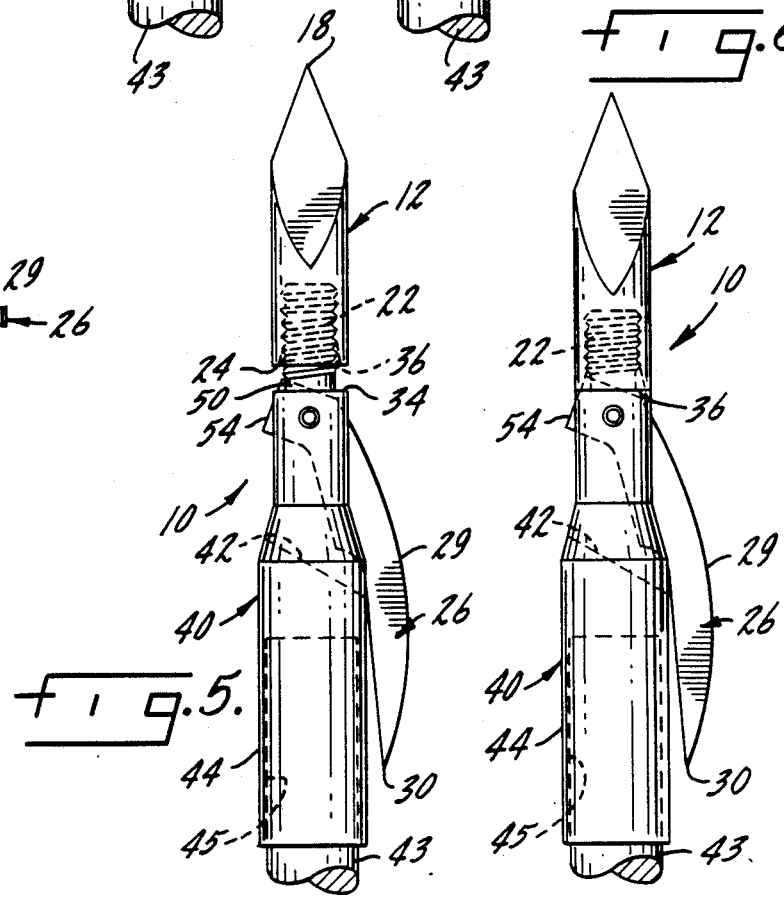

4,901,467

ARROW TIP FOR FISHING

BACKGROUND AND SUMMARY OF THE INVENTION

The present invention relates to an arrow tip for use in bowfishing. The invention is directed to an arrow tip which retains a fish on an arrow, despite spinning motion of the fish.

Arrow tips designed for bowfishing have been used for very many years. There are at least two difficulties with currently available bowfishing tips. In some instances, a retaining portion of the arrow tip, which prevents withdrawal of the arrow from the fish, is threadingly attached to the arrow. This kind of arrangement makes it possible for a vigorous fish to spin and eventually completely remove the retaining portion from the arrow. Use of such devices can result in loss of both fish and arrow tips.

Another difficulty involves removal of the arrow from the fish. In many bowfishing tips, the retaining portion must be removed from the arrow prior to withdrawal of the arrow. In some cases, removal of the retaining portion is difficult and time consuming. During the time required to remove an arrow, the opportunity to harvest additional fish may be lost. In other cases, the retaining portion is retractable, but tends to return to its retaining position during removal of the arrow. If the retaining portion of the tip is returned to its retaining position during removal of the arrow, the tip can get caught and the fish can be damaged. And, the removal of the arrow can be difficult and dangerous, particularly if a sharp point is used.

It is therefore an object of the present invention to provide an arrow tip which easily penetrates and retains a fish on an arrow.

Another object of the present invention is to provide an arrow tip which retains a fish on an arrow despite vigorous twisting and spinning of the fish.

Yet another object of the present invention is to provide an arrow which can be quickly and easily withdrawn from a fish once the fish has been harvested.

A further object of the present invention is to provide an arrow which can be withdrawn from a fish without detaching the retaining portion of the arrow tip from the arrow.

Still a further object of the present invention is to provide an arrow tip which has a retaining portion which can be locked into non-retaining position.

These and other objects of the invention are achieved with an arrow tip which includes a body with a bore in its rearward end, and threads on its forward end. The forward end of the body is slotted to receive a blade pivotable about a pin disposed perpendicularly to the slot. A sharp point is internally threaded and is fitted over the threaded forward end of the body. The blade engages the rearward end of the point as the point is threadingly rotated into position. The point and blade cooperate to provide the blade with three operating positions. In a first working position, a forward edge of the blade prevents rearward pivoting of the blade about the pin. In the working position, projection of the blade from the tip body is assured so that retention of the arrow is achieved. In the second retention position, the blade is allowed to pivot toward the point. In the retention position, the blade is nearly perpendicular to the axis of the arrow. The third removal position of the blade is useful after the fish is caught. The shooter loosens the point and moves the blade to the removal position in which the blade is generally parallel to the arrow's axis. The shooter then tightens the point to lock the blade in the removal position.

BRIEF DESCRIPTION OF THE DRAWINGS

The invention is illustrated in the accompanying drawings wherein:

FIG. 1 is an elevational view of the arrow tip of the present invention in the shooting position;

FIG. 2 is top plan view of the arrow tip shown in FIG. 1;

FIG. 3 is a side elevational view of the arrow tip shown in FIG. 1;

FIG. 4 is an elevational view of the arrow tip of the present invention in the working position;

FIG. 5 is an elevational view of the arrow tip of the present invention in an intermediate position;

FIG. 6 is an elevational view of the arrow tip of the present invention in the removal position.

DETAILED DESCRIPTION OF THE INVENTION

In the following specification the same reference numbers will be used to refer to the same parts throughout the various figures.

FIGS. 1 and 2 show the arrow tip in its shooting position in which an arrow is ready to be placed in a bow. The arrow tip 10 is comprised of a body 40 to which is mounted a blade 26 and a point 12. The point 12 includes three flats 14 which converge at a sharp end 18. The flats 14 intersect one another at edges 16. The point 12 includes a round base 20, and a tapped hole 22 is formed in the end of the round base opposite the sharp end 18. The tapped hole 22 is centrally disposed in the round base and has a diameter smaller than the diameter of the round base 20 so that an annular bottom face 24 is at one end of the point 12. The tapped hole 22 allows the point 12 to be threadably engaged on a threaded stud 50 formed at one end of the body 40.

FIG. 2 shows a slot 42 formed in the body 40. The slot 42 extends from the upper end of the stud 50 through a small diameter section 48 and a tapering section 46 and at least partially through large diameter section 44 of the body 40. The slot 42 is slightly larger in width than the blade 26, so that the blade 26 can pivot around the pin 28. In the shooting position shown in FIGS. 1 and 3, the straight top edge 32 of the blade 26 abuts the bottom face 24 of the point 12. The abutment between the edge 32 and the bottom face 24 prevents rearward rotation of the blade in the direction of the large section 44. Preventing rearward rotation of the blade ensures that the blade will engage the target fish and prevent removal of the arrow.

FIG. 4 shows the arrow tip of the present invention in the working position. In FIG. 4 the blade 26 is rotated in the direction of the point 12. Such forward rotation of the blade will normally occur when the arrow is pulled to retrieve a fish. However, rotation of the blade is restricted by the abutment of the curved forward edge 29 of the blade and the inside edge 36 of the tapped hole 22. As the blade passes through the target fish and clears through the far side of the target, the outward and forward rotation of the blade increases the retaining capacity of the blade and the wider angled orientation of the blade prevents the blade from passing back through the path of entry through the fish. The decreased likelihood of disengagement between the arrow and the fish is due to the larger overall width of the arrow tip in the working position, and is due to the less severe angle of the blade 26 as compared to the sharp presentation of the point 30 as shown in FIG. 1. The less severe angle of the blade means that it is less likely that the blade will form a new path through the fish as the fish is pulled toward the shooter.

Once a target fish has been harvested, and it is desired to remove the arrow from the fish, the features of the present invention shown in FIGS. 5 and 6 come into play. Without completely removing the point 12, but by merely loosening the point, the blade can be pivoted into a removal position, shown in FIGS. 5 and 6. Upon retightening the point 12, the lateral face 54 of the blade 26 engages the inside edge 36 of the tapped hole. When the point 12 is fully retightened, the blade 26 is held against rotation in a position which minimizes its lateral extent. In the removal position, the blade point 30 is adjacent to the large section 44 so that minimum resistance to removal of the arrow will occur.

Once the arrow has been removed from the fish, the arrow tip can be returned to the shooting position by simply rotating the point 12 a few turns and pivoting the blade to the position shown in FIG. 1 and retightening the point into abutment with the upper surface 34 of the small diameter section 48.

An important aspect of the invention relates to the ability of the arrow tip described above to withstand spinning of a target fish when it is first hit. Many fish spin wildly when they are first struck by an arrow. In some bowfishing tips, the means by which the removal of the arrow is prevented are threadingly engaged to the arrow shaft. In such cases, several turns of the retaining means relative to the arrow body can result in separation of the retaining means from the arrow and loss of the catch. With the arrow tip of the present invention, the blade which in the working position prevents removal of the fish is not threadingly attached to the body 40 or the shaft 43. In fact, because the shaft 43 is fixed into the bore 45, rotation of the blade by a spinning fish will necessarily cause of rotation of the entire arrow. Furthermore, since the point 12 has a small diameter and has a round base 20, there is very little tendency for rotation of the fish to cause loosening of the point 12. It should be noted, however, that even if rotation of the tip relative to the body 40 were to occur, even several rotations would not result in loss of effectiveness of the retention provided by the blade. Abutment between the curved edge 29 of the blade 26 and the bottom face 24 of the point 12 continues to support the blade in a laterally extending position even if the point 12 does become loosened.

It should also be noted that the pin 28 may be made removable to allow replacement of the blade 26. Similarly, the point 12 can be replaced in the event that the sharp end 18 becomes damaged. The sharp end 18 is intended to allow use of lighter poundage bows, such as those used by women and younger shooters. Clearly, alternative configurations of the point 12 may be used.

While a specific embodiment of the invention has been shown and described, it will be apparent to those skilled in the art that numerous alternatives, modifications, and variations of the embodiment shown can be made without departing from the spirit and scope of the appended claims.

I claim:

1. An arrow tip for use in bowfishing comprising an elongated body having a rear end with means for connecting said tip to an arrow, a point attached to a front end of said body with means to facilitate penetration of said tip into said fish, pivoting retainer means moveable to at least three positions, a first position being a shooting position, a second position being a retention position, a third position being a removal position, said retainer means being a blade having a pivoting end attached to the body and having a surface which contacts said point to restrict rearward rotation of said blade.

2. An arrow tip for use in bowfishing in accordance with claim 1 wherein:
said point is threadingly attached to said body.

3. An arrow tip for use in bowfishing in accordance with claim 1 wherein:
said retainer means cooperates with said point whereby threaded advancement of said point allows movement of said retainer means to said third position generally parallel to an axis of said body.

4. An arrow tip for use in bowfishing in accordance with claim 1 wherein:
said means for connecting said tip to an arrow comprises a large opening in one end of said body, said body including a slot for receiving said retainer means, said body having external threads on a forward portion of said body.

5. An arrow tip for use in bowfishing in accordance with claim 1 wherein:
said point and said retainer means cooperate to lock said retainer means in said third position generally parallel to said body.

6. An arrow tip for use in bowfishing in accordance with claim 5 wherein said point is threadingly attached to said body at an externally threaded forward portion of said body, said retainer means comprising a blade having a first edge engagable with a rearward section of said point, abutment between said first edge and said rearward section preventing rearward rotation of said blade, said blade having a second edge and abutment between said second edge and said rearward section locking said blade in a position whereby said blade lies generally parallel to said body.

7. An arrow tip for use in bowfishing comprising an elongated body having one end with means for non-rotatably connecting said body to an arrow shaft, a replaceable point removably attached to an opposite end of said body, said body having pivotable retaining means connected thereto, said retaining means being able to assume a plurality of positions relative to said body, said positions having differing overall lateral extents, said pivotable retaining means being connected to said body such that rotation of said pivotable retaining means about the longitudinal axis of said body relative to said body is prevented, said retaining means being a blade having a pivoting end attached to the body and having a surface which contacts said point to restrict rearward rotation of said blade.

8. An arrow tip for use in bowfishing in accordance with claim 7 wherein:
said point is threadingly attached to said body.

9. An arrow tip for use in bowfishing in accordance with claim 7 wherein:
said retaining means cooperates with said point whereby threaded advancement of said point allows movement of said retaining means to a position generally parallel to an axis of said body.

10. An arrow tip for use in bowfishing in accordance with claim 7 wherein:
said means for connecting said tip to an arrow comprises a large opening in one end of said body, said body including a slot for receiving said retaining means, said body having external threads on a forward portion of said body.

11. An arrow tip for use in bowfishing in accordance with claim 7 wherein:
said point and said retaining means cooperate to lock said retaining means in a position generally parallel to said body.

12. An arrow tip for use in bowfishing in accordance with claim 11 wherein said point is threadingly attached to said body at an externally threaded forward portion of said body, said blade having a first edge engagable with rearward section of said point, abutment between said first edge and said rearward section preventing rearward rotation of said blade, said blade having a second edge and abutment between said second edge and said rearward section locking said blade in a position whereby said blade lies generally parallel to said body.

* * * * *